March 28, 1967 K. LEITNER 3,311,148
CONICAL COLLAR NUTS HAVING SPACED FLATS
Filed March 8, 1965 2 Sheets-Sheet 1
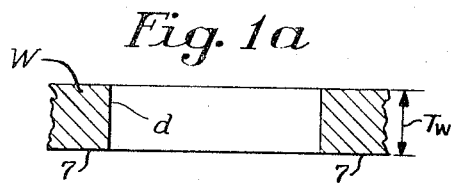
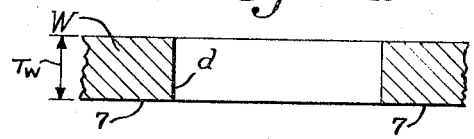
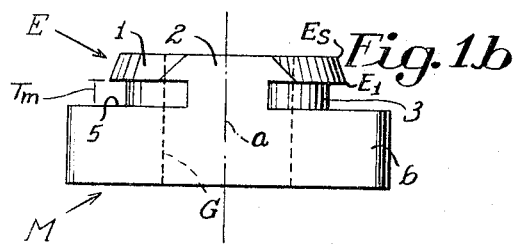
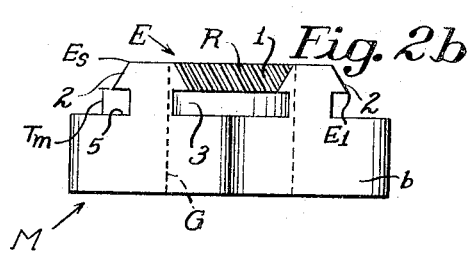
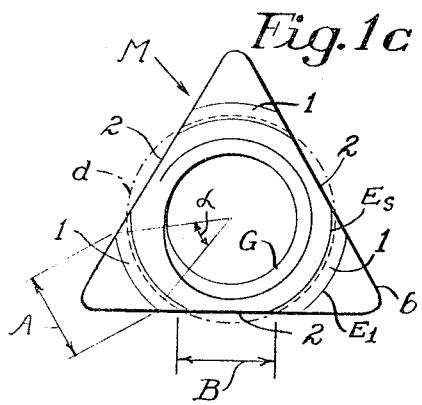
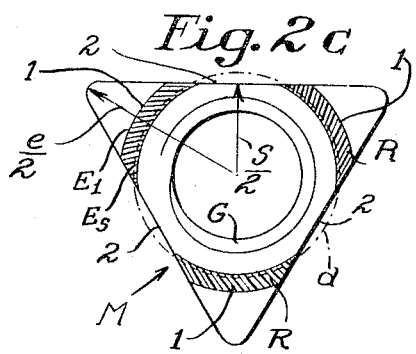
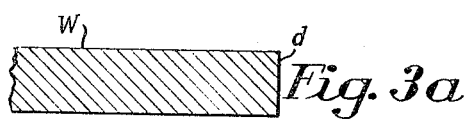
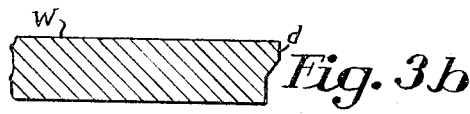
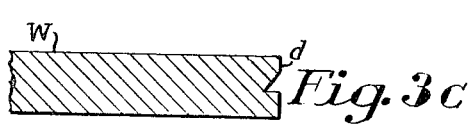
Inventor
Kajetan Leitner
By His Attorney
Carl E. Johnson.

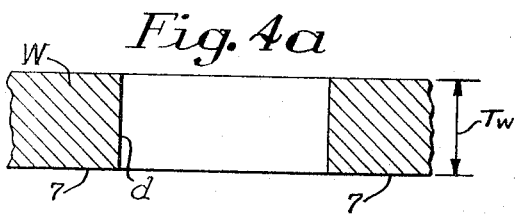
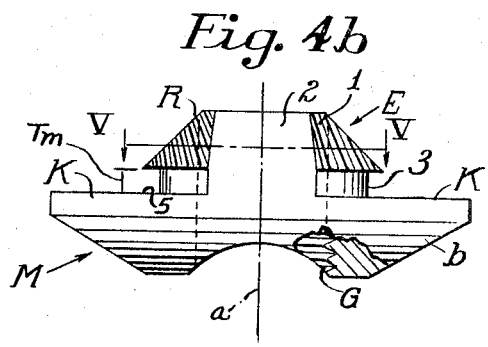
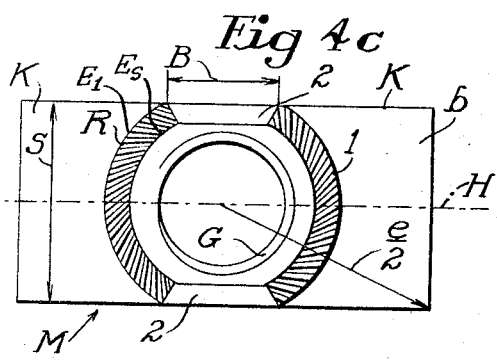
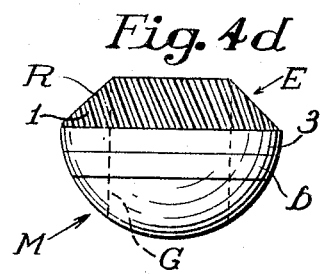
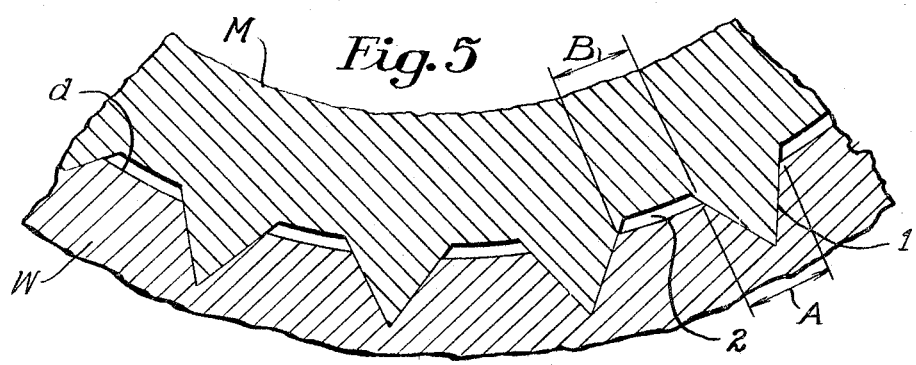

United States Patent Office 3,311,148
Patented Mar. 28, 1967

3,311,148
CONICAL COLLAR NUTS HAVING SPACED FLATS
Kajetan Leitner, 187 Waal 8939, Germany
Filed Mar. 8, 1965, Ser. No. 437,673
5 Claims. (Cl. 151—41.73)

This invention relates to fasteners, and more particularly to nuts of the type having collars adapted to become self-locking when mounted in an opening in ductile or deformable material. While the invention is herein illustrated in several embodiments, it will be understood that the invention is not thus limited.

There have hitherto been available nuts having tapered collars projecting from an intermediate annular groove, which collars, when forced into a mating hole of a mounting wall under considerable pressure, cause outwardly displaced wall material to flow into the groove to secure the nut in operative position. Only the circular collars of such nuts are inserted. While reliable installations are thus attained, hydraulic or pneumatic inserting tools are required to exert the 1000 to 2000 lbs. of force needed for soft aluminum walls and up to about 7000 lbs. for mild steel. The present invention, in contrast thereto, contemplates a different type of so-called collar nut which has a collar configuration particularly adapted for mounting in relatively easy manner in a deformable wall. As distinguished from known collar nuts, the novel collar of this invention is shaped to be received in a bore which need not be exactly circular, yet if circular its diameters need not be consistently and exactly uniform. This characteristic is of special convenience when working with thin wall metal mountings, as in electrical shielding for instance, since bores formed therein either by drilling or punching or otherwise are inevitably out of round to some extent despite precautions.

In view of the foregoing it is a primary object of this invention to provide an improved, inexpensive nut easily mountable in a hole formed in a material softer than the nut, and permitting greater tolerance for the diameter of the hole. In accordance with this object, a feature of the invention resides in the provision of a nut having a base and an integral collar projecting therefrom, the collar being frusto-conical and having its larger diameter spaced from an adjacent portion of the base and nearer that base portion than the smaller or pilot diameter of the collar, the periphery of the collar including parts which are alternately oversized and undersized in relation to a receiving hole for the collar.

The above and other features of the invention will now be described with greater particularity in connection with the several embodiments and with reference to the accompanying drawings thereof, in which:

FIGS. 1a, 1b and 1c respectively show a sectional view of a part ready to receive a self-retaining nut in accordance with one form of the invention, a view in side elevation of that nut, and a plan view of the nut;

FIGS. 2a, 2b, and 2c respectively show a sectional view of a part for receiving another form of nut according to this invention, a view in side elevation of this nut, and a plan view of the nut;

FIGS. 3a, 3b, and 3c respectively show fragmentary sections of an initially undeformed wall defining a receiving bore, this wall as deformed by the collar of the nut of FIG. 1b or 2b at an initial stage of insertion, and the wall as deformed finally after installation;

FIGS. 4a to 4d respectively show a sectional view of a part for receiving a nut according to a third form of the invention, a view in side elevation of the nut with a portion broken away, a plan view of the nut, and an end view of the nut; and FIG. 5 is a section taken on the line V—V of FIG. 4b but assuming the teeth are spaced further apart, and showing thread interengagement with a receiving wall, on an enlarged scale.

Corresponding portions of the several embodiments bear like reference characters in the several views.

In FIGS. 1b and 1c a nut generally designated M has a base portion B that is substantially an equilateral triangle. Integral with the base $b$ and concentric with the axis $a$ of a screw threaded bore G extending through the nut M is a projecting neck 3 and a coaxial, frusto-conical collar E. The larger diameter $E_1$ of this collar is usually parallel to an adjacent surface 5 of the base base portion $b$ which is to abut a surface 7 of a part W (FIG. 1a) surrounding its bore $d$. The smaller diameter $E_s$ of the collar is more remote from the surface 5 of the base portion $b$ than the larger collar diameter $E_1$, the distance $T_m$ between the diameter $E_1$ and the surface 5 being less than the thickness dimension $T_w$ of the part W. The larger collar diameter $E_1$ is oversized with respect to the receiving bore $d$ for reasons hereinafter explained. Preferably these collar diameters $E_s$ and $E_w$ are such that the conical surface of a frusto-conical sector 1 makes an angle of substantially 20° with the axis $a$ of the threaded nut bore G. As can best be seen in FIG. 1c the vertical, i.e. triangle sides of the base $b$ are projected to slab off the collar E and thus provide three spaced flats 2 (FIGS. 1b and 1c). These collar flats 2 are therefore undersized with respect to the receiving bore $d$ and alternate with oversized collar sectors 1. The sectors 1 respectively have a peripheral dimension designated A (FIG. 1c) and are subtended by an angle $\alpha$ in the center of the nut.

For mounting the nut M of FIGS. 1b, 1c in the part W the collar E is first positioned axially into the bore $d$ until the base surface 5 of the nut abuts the surface 7 of the part W. This causes the wall of the bore $d$ to be deformed by the frusto-conical sectors 1 of the collar E as indicated in FIG. 3b, while the bore walls adjacent to the flats 2 remain undeformed as shown in FIG. 3a. In the second and final step of the installation the triangular nut M is rotated about its axis $a$ through the angle corresponding substantially to the angle $\alpha$, and preferably in a direction opposite to that of the internal screw thread B. The turning of the nut M as well as its initial insertion may be effected by a suitable tool of simple construction. In the course of rotation of the nut M relative to the part W, the oversized sectors 1 are forced circumferentially into those hitherto undeformed portions of the bore wall and thus cause radial deformation therein as indicated in FIG. 3b. As shown in FIG. 3c, undeformed portions of the bore wall retaining their initial radius to a depth equal to that of the neck 3 lie below the rotated sectors 1. Accordingly the nut M is anchored in the part W by taking advantage of its plastic deformation but not its elasticity.

Nuts utilizing the frusto-conical collar and having spaced undersized flats may take other forms, for instance a 2-flat type such as will later be described with reference to FIGS. 4b to 4d. The number of oversized collar parts and flats occurring alternately around a collar is not especially significant, but the smaller the number the higher the tolerance in fitting a nut to a part to be joined.

The nut M shown in FIGS. 2b and 2c is essentially like that of FIGS. 1b and 1c except that the frusto-conical sectors 1 are provided with teeth forming threads R. These threads R preferably have an inclination opposite to that of the internal screw thread G. In the course of rotation after partial insertion in the bore $d$ (FIG. 2a), the threads R will cause the nut M to be moved axially thereby effecting full engagement of the base $b$ of the nut M with the part W even though the nut has initially been pressed into the bore $d$ slightly askew. Also, the thread R causes axial pressure to be exerted against the surface 7 of the part W when it is abutted by the surface 54 the nut base b.

Referring now to FIGS. 4a to 4d, a collar nut M has a base b rectangular in shape when viewed in plan as in FIG. 4c, and semi-circular in section as shown in FIG. 4d. The base b is formed centrally with an internally threaded bore G. Projecting upwardly from a flat upper surface of the base b, having a width S, is a neck 3 over which there is formed a frusto-conical collar E. In this case the width S desirably corresponds to twice the width across flats 2 each having a peripheral length B. The larger diameter $E_1$ of the collar E is oversized in relation to the diameter of the receiving bore d, and the diameter of the neck 3 as well as that of the smaller diameter $E_s$ of the collar are such as to enable the collar to be forced axially into the bore d. Except in the case of blind nuts, i.e. those to be installable from one side only of the part W, the width B of the undersized flats 2 should be the same as or larger than the peripheral width A of the oversized collar parts 1 shown in FIG. 1c.

In the rotational stage of installation of the nut M of FIG. 4b, i.e. after forcing the collar E axially into the bore d until the base b abuts the part W, the turning about the axis is opposite to the hand on the internal thread G and continues through an angle not larger than that made by radii of the collar subtended by the flats B. This forces the oversized parts 1 into those portions of the wall bore d not hitherto deformed by the undersized flats 2. An improved anchoring thread interengagement as shown in FIG. 5 is effected when the collar threads R are spaced further apart, have a root-circle diameter smaller than the diameter of the bore d and are disposed over the entire circumference of the collar E, the collar thread being oversized in relation to the bore.

If the undersized flats 2 have a larger peripheral dimension than the oversized parts 1, then even after turning the nut M through an angle corresponding to B, strips of the wall of the bore will still remain unchanged in shape and hence will resist further turning and guard against the possibility of the nut M turning with a bolt as the latter is threadedly received in the nut.

Having thus described my invention, what I claim as new and desire to secure by Leters Patent of the United States is:

1. A nut adapted for mounting in a bore of a deformable part, said nut having a non-circular base including a plurality of flat side walls, a neck portion corresponding substantially to the shape of the deformable part bore and projecting from the base, an internally threaded bore, and a generally frusto-conical collar centered on the neck portion, said collar having its larger diameter adjacent to the neck portion and larger than the undeformed bore of the deformable part, and the smaller diameter of the collar being equal to or less than the diameter of the deformable part bore, alternate portions of the collar periphery being formed with flats defined by projection of the side walls of the base which, on insertion of the neck and the collar axially into the deformable part bore, do not deform the part, and other alternate portions of the collar serving, upon relative rotation of the collar in the part, to be forced circumferentially into the wall of the deformable part bore and anchor the nut therein, the periphery of the frusto-conical collar being formed with an external screw thread, the inclination of which is opposite to that of the thread of said internally threaded bore.

2. A nut as set forth in claim 1 wherein said collar periphery comprises a single pair of opposed flats.

3. A nut as set forth in claim 2 wherein the base of the nut is generally rectangular, and the frusto-conical collar has its periphery disposed at an angle of substantially 20° to the axis of the internally threaded bore of the nut.

4. A nut as set forth in claim 1 wherein the base is triangular.

5. A nut as set forth in claim 1 wherein the screw-thread on said collar has a root-circle diameter equal to or smaller than the diameter of the wall of a collar-receiving bore in said deformable part, the collar thread is oversized in relation to said bore, and the collar portions along the root-circle constitute undersized flats.

References Cited by the Examiner

UNITED STATES PATENTS

| | | | |
|---|---|---|---|
| 1,447,515 | 3/1923 | Miller | 151—41.73 |
| 2,019,049 | 10/1935 | Hoke | 151—41.73 |
| 2,139,590 | 12/1938 | Jessop | 29—520 |
| 2,172,827 | 9/1939 | Becker | 85—5 |

FOREIGN PATENTS

| | | |
|---|---|---|
| 500,583 | 3/1954 | Canada. |
| 1,153,986 | 10/1957 | France. |

CARL W. TOMLIN, *Primary Examiner.*

R. S. BRITTS, *Assistant Examiner.*

UNITED STATES PATENT OFFICE
CERTIFICATE OF CORRECTION

Patent No. 3,311,148

March 28, 1967

Kajetan Leitner

It is certified that error appears in the above identified patent and that said Letters Patent are hereby corrected as shown below:

Column 3, lines 47 and 48, cancel "including a plurality of flat side walls" and insert the same after "base" in line 2, column 4.

Signed and sealed this 20th day of January 1970.

(SEAL)
Attest:

Edward M. Fletcher, Jr.
Attesting Officer

WILLIAM E. SCHUYLER, JR.
Commissioner of Patents